(12) United States Patent
Drolia et al.

(10) Patent No.: US 12,229,930 B2
(45) Date of Patent: Feb. 18, 2025

(54) DISTORTION-BASED FILTERING FOR IMAGE CLASSIFICATION

(71) Applicant: NEC Laboratories America, Inc., Princeton, NJ (US)

(72) Inventors: Utsav Drolia, Milipitas, CA (US); Srimat Chakradhar, Manalapan, NJ (US); Sibendu Paul, West Lafayette, IN (US)

(73) Assignee: NEC Corporation, Tokyo (JP)

(*) Notice: Subject to any disclaimer, the term of this patent is extended or adjusted under 35 U.S.C. 154(b) by 677 days.

(21) Appl. No.: 17/496,246

(22) Filed: Oct. 7, 2021

(65) Prior Publication Data

US 2022/0114717 A1 Apr. 14, 2022

Related U.S. Application Data

(60) Provisional application No. 63/089,681, filed on Oct. 9, 2020, provisional application No. 63/089,570, filed on Oct. 9, 2020.

(51) Int. Cl.
*G06N 3/04* (2023.01)
*G06T 7/00* (2017.01)
*H04N 23/60* (2023.01)

(52) U.S. Cl.
CPC .......... *G06T 7/0002* (2013.01); *G06N 3/04* (2013.01); *H04N 23/64* (2023.01); *G06T 2207/20081* (2013.01); *G06T 2207/20084* (2013.01); *G06T 2207/30168* (2013.01); *G06T 2207/30232* (2013.01)

(58) Field of Classification Search
CPC ........ G06T 7/0002; G06T 2207/20081; G06T 2207/20084; G06T 2207/30168; G06T 2207/30232; G06T 2207/10016; G06T 2207/30196; G06N 3/04; G06N 3/045; G06N 3/084; H04N 23/64; H04N 23/71; H04N 23/73; H04N 23/75
USPC ....................................................... 382/157
See application file for complete search history.

(56) References Cited

U.S. PATENT DOCUMENTS

| | | | | |
|---|---|---|---|---|
| 2019/0303720 A1* | 10/2019 | Karam | ............... | G06V 10/7715 |
| 2021/0343030 A1* | 11/2021 | Sagonas | .................. | G06T 7/30 |
| 2022/0148146 A1* | 5/2022 | Morzos | ................. | G06T 7/0002 |

OTHER PUBLICATIONS

Mittal, Anish, et al. "No-reference image quality assessment in the spatial domain", IEEE Transactions on image processing, vol. 21, No. 12. Dec. 2012, pp. 4695-4708.

Szegedy, Christian, et al. "Going deeper with convolutions", InProceedings of the IEEE conference on computer vision and pattern recognition. Jun. 1, 2015, pp. 1-9.

Deng, Jia, et al. "Imagenet: A large-scale hierarchical image database", In2009 IEEE conference on computer vision and pattern recognition Jun. 20, 2009, pp. 248-255.

(Continued)

*Primary Examiner* — Charlotte M Baker
(74) *Attorney, Agent, or Firm* — Joseph Kolodka

(57) ABSTRACT

Methods and systems for image filtering include detecting a distortion level of input images, using a distortion detection model that is trained using confidence values generated by a pre-trained image classifier with a set of distorted training images. An analysis is performed on input images having a detected distortion level that is lower than a threshold, with input images having an above-threshold detected distortion level being filtered out.

18 Claims, 9 Drawing Sheets

(56) References Cited

OTHER PUBLICATIONS

He, Kaiming, et al. "Deep residual learning for image recognition", InProceedings of the IEEE conference on computer vision and pattern recognition. Jun. 2016, pp. 770-778.
Talebi, Hossein, et al. "NIMA: Neural Image Assessment", IEEE Transactions on Image Processing, vol. 27, No. 8. Aug. 2018, pp. 3998-4011.
Szegedy, Christian, et al. "Rethinking the inception architecture for computer vision", InProceedings of the IEEE conference on computer vision and pattern recognition. Jun. 28, 2016, pp. 2818-2826.
Li, Yuanqi, et al. "Reducto: On-camera filtering for resource-efficient real-time video analytics", InProceedings of the Annual conference of the ACM Special Interest Group on Data Communication on the applications, technologies, architectures, and protocols for computer communication. Jul. 30, 2020, pp. 359-376.

* cited by examiner

DISTORTION-BASED FILTERING FOR IMAGE CLASSIFICATION

RELATED APPLICATION INFORMATION

This application claims priority to U.S. Provisional Patent Application No. 63/089,681, filed on Oct. 9, 2020, and to U.S. Provisional Patent Application No. 63/089,570, filed on Oct. 9, 2020, incorporated herein by reference in their entirety.

BACKGROUND

Technical Field

The present invention relates to image classification, and, more particularly, to distortion recognition and filtering in images.

Description of the Related Art

Image capture and transmission may be degraded in a number of ways, including environmental conditions and data packet loss. Degraded images may, for example, include low-light noise, motion blur, focal blur, compression artifacts, over-exposure, under-exposure, etc. Such degradations and distortions lower the accuracy of any analytics that are performed using the degraded images.

SUMMARY

A method for image filtering includes detecting a distortion level of input images, using a distortion detection model that is trained using confidence values generated by a pre-trained image classifier with a set of distorted training images. An analysis is performed on input images having a detected distortion level that is lower than a threshold, with input images having an above-threshold detected distortion level being filtered out.

A method for image filtering includes performing distortion operations on a set of original training images to generate distorted training images corresponding to the original training images. A neural network of a distortion detection model is trained using the set of original training images and the distorted training images corresponding to the original training images, based on confidence values generated by a pre-trained image classifier. A distortion level of input images is detected, using the distortion detection model. An analysis is performed on input images having a detected distortion level that is lower than a threshold, with input images having an above-threshold detected distortion level being filtered out. An image capture setting is adjusted responsive to a determination that the input image has an above-threshold distortion level.

A system for image filtering includes a hardware processor and a memory that stores a computer program. When executed by the hardware processor, the computer program causes the hardware processor to detect a distortion level of input images, using a distortion detection model that is trained using confidence values generated by a pre-trained image classifier with a set of distorted training images, and to perform analysis on input images having a detected distortion level that is lower than a threshold, with input images having an above-threshold detected distortion level being filtered out.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Degraded images can be detected and filtered out, to prevent their use for analyses where they would cause mispredictions and misclassifications. The detection of degraded images can also be used to provide feedback to image acquisition systems to improve subsequently captured images, so that they can be properly processed by the analytics.

Toward that end, types of image degradation can be classified. For example, a classifier may identify whether a low-quality image suffers from compression artifacts, an out-of-focus camera, over-exposure, or any other type of degradation. The classifier may also estimate an extent of the degradation, to determine a quality level for the image. A deep neural network may be trained to perform this analysis of the input image.

Figure 1:
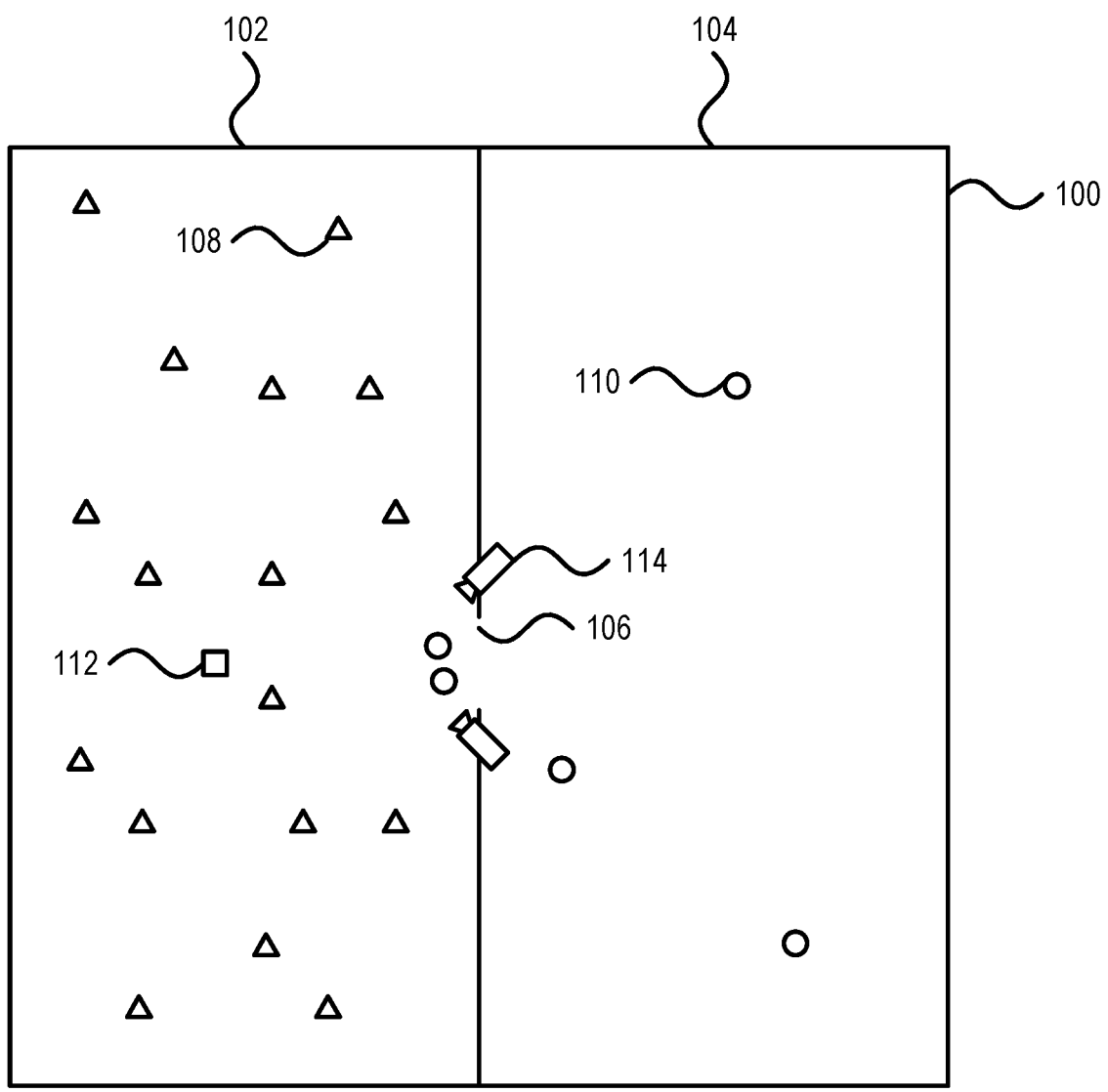
FIG. 1 is a diagram of a space that is monitored with image capture devices, where images captured by the image capture devices may include distortions, in accordance with an embodiment of the present invention.

Referring now in detail to the figures in which like numerals represent the same or similar elements and initially to FIG. 1, a monitored environment 100 is shown. The environment 100 shows two regions, including an uncontrolled region 102 and a controlled region 104. It should be understood that this simplified environment is shown solely for the sake of illustration, and that realistic environments may have many such regions, with differing levels of access control. For example, there may be multiple distinct controlled regions 104, each having different sets of authorized personnel with access to them. In some embodiments, regions may overlap.

A boundary is shown between the uncontrolled region 102 and the controlled region 104. The boundary can be any appropriate physical or virtual boundary. Examples of physical boundaries include walls and rope—anything that establishes a physical barrier to passage from one region to the other. Examples of virtual boundaries include a painted line and a designation within a map of the environment 100. Virtual boundaries do not establish a physical barrier to movement, but can nonetheless be used to identify regions with differing levels of control. A gate 106 is shown as a passageway through the boundary, where individuals are permitted to pass between the uncontrolled region 102 and the controlled region 104.

A number of individuals are shown, including unauthorized individuals 108, shown as triangles, and authorized individuals 110, shown as circles. Also shown is an attacker 112, shown as a square. The unauthorized individuals 108 are permitted access to the uncontrolled region 102, but not to the controlled region 104. The authorized individuals are permitted access to both the uncontrolled region 102 and the controlled region 104. The attacker 112 is seeks to undermine the efficacy of the facial recognition system, for example by providing visual inputs that affect the facial recognition model being used.

The environment 100 is monitored by a number of video cameras 114. Although this embodiment shows the cameras 114 being positioned at the gate 106, it should be understood that such cameras can be positioned anywhere within the uncontrolled region 102 and the controlled region 104. The video cameras 114 capture live streaming video of the individuals in the environment, and particularly of those who attempt to enter the controlled region 104.

The video streams generated by the video cameras 114 may be processed to identify objects within the frames of the video streams. Although face detection is specifically described herein, it should be understood that any kind of processing may be performed, for example to identify vehicles, license plates, animals, etc. The detected object may be compared to objects in a watchlist. In the case of faces, a similarity metric may be used to compare a detected face from a frame of the video streams to a set of different faces that are stored in the watchlist.

Images captured by the video cameras 114 may be degraded by various different effects. In-capture distortions may be generated by the camera hardware or on-board processing software during the video capture process. Such distortions may include, for example, texture distortions, exposure artifacts, artifacts from lens limitations, and focus and color aberrations. Other distortions, such as lighting (e.g., low-light, glare, and haze), noise sensitivity, acquisition speed, in-camera processing, camera setup, and camera shake can also adversely affect a video image's visual quality. Some distortions, like exposure and color-related distortions, may occur more frequently than others.

Other forms of distortion may be introduced after capture. For example, video compression may be lossy, and transmission over computer networks can be error-prone, which can introduce distortions that adversely affect the video quality. These distortions occur naturally in video acquisition and transmission, and need not be introduced by an adversarial actor.

Distortions may lower the human-perceived image quality, but may also adversely affect the accuracy of video analytics. For classification tasks, for example, distortions may reduce classification confidence, or cause misclassification. In some cases, the distortion may produce a high confidence in an incorrect classification. Such high-confidence errors adversely affect the accuracy of the analytics application and cannot be filtered out based solely on a confidence threshold. Even in those cases where the misclassification is produced with a low confidence value, the low-quality image may still need to be transmitted and processed before being filtered by the classifier, which wastes computing and network resources.

To prevent misclassification from low-quality images, these distorted images may be detected and filtered out. Such detection may be performed immediately after image capture, so that low-quality images need not be transmitted and processed by downstream tasks at all.

Low-quality images may be handled using a detection and filtering system that includes, for example, a feature extractor that identifies aspects of an image that are important to the image's perceptual quality, and a regressor that assigns a quality score. Analytical quality estimation should extract features that are representative of the image features that a classifier will consider. The estimator does not need to classify images itself; the extraction process does not have to learn higher-level features that would be used in image classification.

The analytical quality estimation should further correlate strongly with the classifier's notion of image quality. Thus, the estimator should consider a classifier's output, rather than the perceptual judgments of a human observer. The regressor should therefore produce quality scores that correlate with the classifier's image quality assessments.

Figure 2:
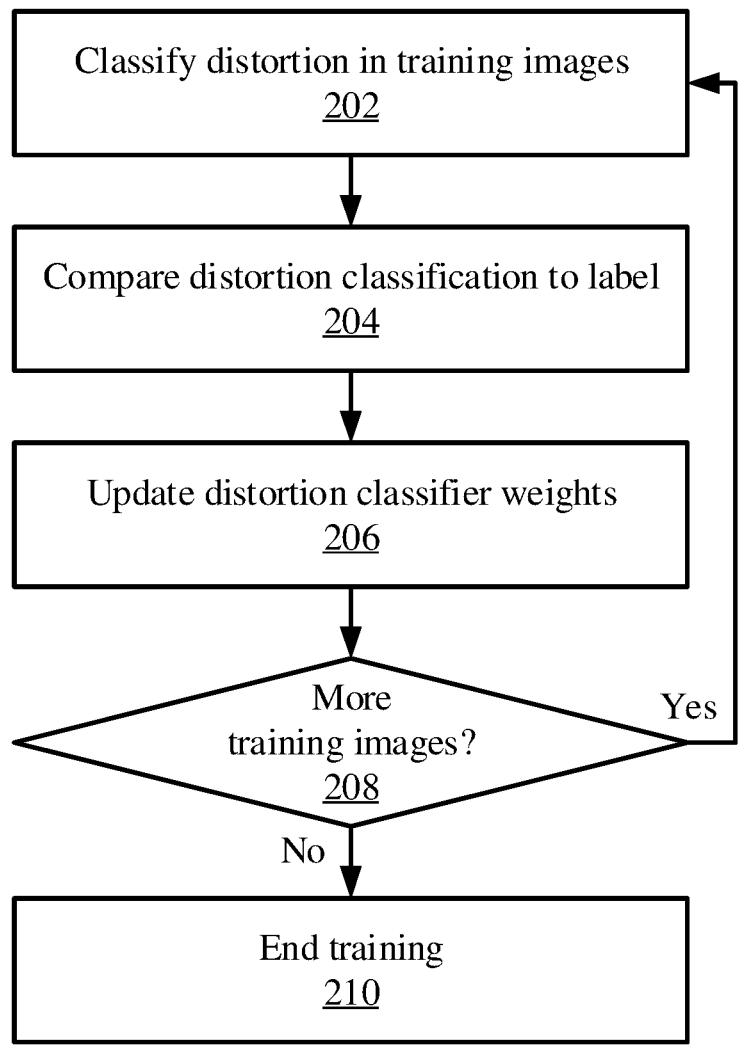
FIG. 2 a block/flow diagram of a method for training an image distortion detection model to identify images that include distortions, in accordance with an embodiment of the present invention.

Referring now to FIG. 2, a method for training a distortion classifier is shown. A distortion classifier model may be implemented as, for example, an artificial neural network. Training images are supplied, each being labeled according to a distortion type and having a respective target score. In some cases, the target score may represent information gleaned from image classifiers, generating a semi-supervised training dataset. An example for how the training dataset may be generated is described in greater detail below.

Block 202 uses the distortion classifier model to determine a type of distortion (if any) that is present in the image. The classifier may output a distortion type and a distortion level, the latter of which indicates a degree of distortion within the image. Block 204 then compares the distortion classification to the label associated with the image, and compares the distortion level to the target score associated with the image. Differences between the values that are supplied with the training image and the values that are generated by the distortion classifier are used to update the weights of the distortion classifier's neural network in block 206. Block 208 determines whether there are more training images to process. If so, processing returns to block 202 and a next training image is selected. If not, training concludes in block 210.

To generate the training images, distortions may be applied to a set of original images. These images may depict a variety of different scenes and features, and may be derived from image classifier training data. For example, training data for face recognition may include a variety of different face images, including images of different people, in different lighting and poses, and with differing levels of occlusion. Training data for object detection and avoidance, such as for a self-driving car, may include images of road scenes, including traffic signs, obstacles, and pedestrians.

Figure 3:
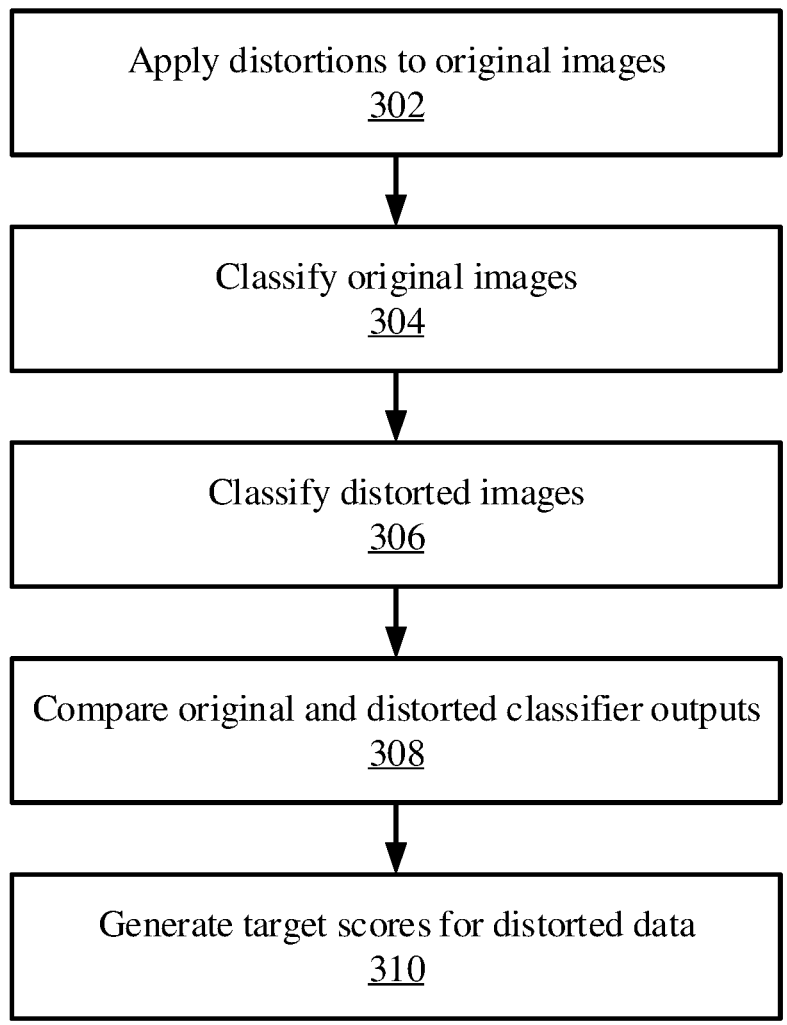
FIG. 3 is a block/flow diagram of a method for generating distorted training data to be used in training an image distortion detection model, in accordance with an embodiment of the present invention.

Referring now to FIG. 3, a method of generating training data is shown. Block 302 applies distortions to the original images of a training dataset. Each image may be distorted with one or more distortions, such as focal blur, compression, gaussian blur, motion blur, low light noise, etc. It should be understood that the types of distortion described herein are meant to be illustrative, and should not be construed as limiting the types of distortion that may be applied at this stage. Each distortion type may furthermore be applied at varying levels. As a result, each original image from the training dataset may be used to generate multiple distorted images, of differing distortion types and differing degrees of distortion.

Block 304 applies each original image to one or more trained image classifiers. Each classifier may provide an array of confidence scores, where each confidence score represents a probability that the image belongs to a respective class. For example, for an image detection classifier, the confidence scores may each correspond to a respective kind of object that may be in the image. Block 306 similarly applies each distorted image to the one or more trained image classifiers, generating arrays of confidence scores that relate to the distorted images.

Based on these outputs, label information can be automatically generated, relating to the distortions that are applied to the distorted images. For each distorted image, a label may be generated using the array of confidence scores for the distorted image and the array of confidence scores for the corresponding original image in block 308. For example, the entire softmax output of an image classifier may be used as an indicator of image quality. Any appropriate function can be used to generate this combined score. In some examples, a difference between the distorted image's array of confidence values and the corresponding original image's array of confidence values may be determined. In other examples, a mean absolute error can be used, or, if the ground truth of the classification for the original image is known, the difference of only the correct label's confidence scores may be used. In an illustrative example, a semi-supervised classifier opinion score may be defined as the distance between softmax outputs of the original image and the distorted image. The distance can be calculated using a number of different approaches, including Kullback-Leibler divergence, mean absolute difference, L1/L2 norms, and the Bhattacharyya distance.

For each distorted image, block 310 generates target scores that are based on an aggregate of the output of block 308 for each of the classifiers. For example, the outputs may be averaged to arrive at a mean classifier opinion score. Thus, each distorted image may have an associated target score that forms part of the training image dataset. The mean classifier opinion score may be expressed as:

$$MCOS = \frac{1}{\|M\|} \sum_{i \in M} D(Softmax_{orig}^i, Softmax_{dist}^i)$$

where M is a number of classifiers, $Softmax_{orig}^i$ is the softmax output of the $i^{th}$ classifier for an original image, and $Softmax_{dist}^i$ is the softmax output of the $i^{th}$ classifier for a distorted image.

In addition, or alternatively, a score may be generated using a semi-supervised approach, which does not need labeled data. The entire softmax output of a classifier may be used for a given input image as an indicator of the image quality. Based on the softmax output, a semi-supervised classifier opinion score may be calculated, representing the distance between softmax outputs for the original image and the distorted version. Because the softmax output for original images will tend to be a unimodal distribution across classes, with a strong peak at the correct class, but a distorted image will make the distribution more uniform, the semi-supervised classifier opinion score can detect distorted images, and may be calculated as:

$$MCOS_{SS} = \frac{1}{\|M\|} \sum_{i \in M} D(Softmax_{orig}^i, Softmax_{dist}^i)$$

Figure 4:
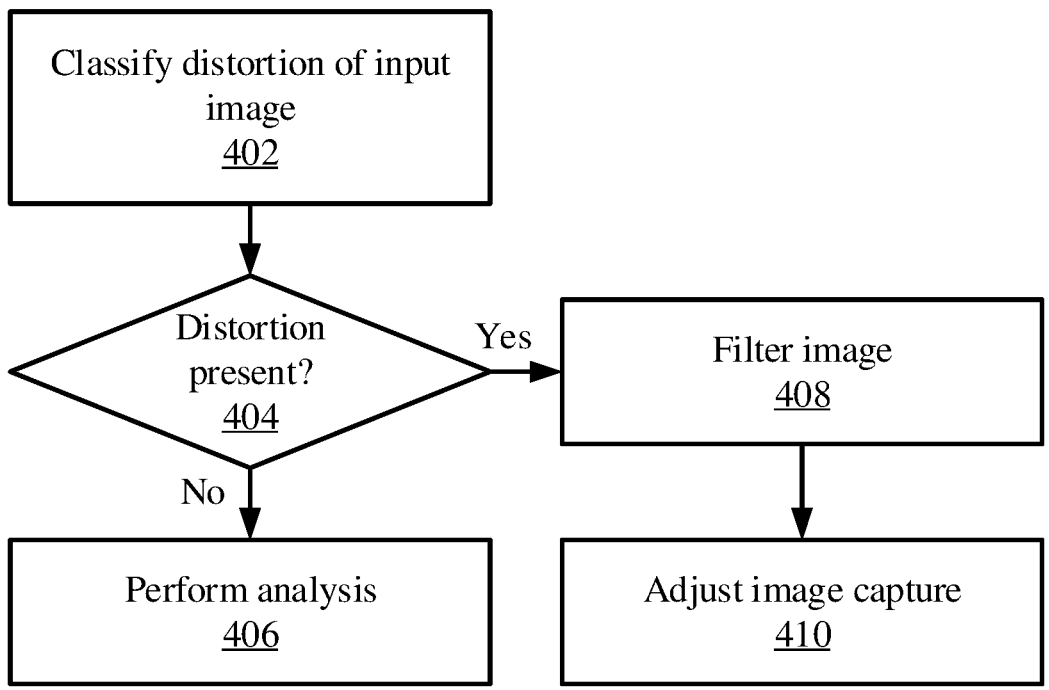
FIG. 4 is a block/flow diagram of a method for filtering distorted images before analysis, in accordance with an embodiment of the present invention.

Referring now to FIG. 4, a method of performing image classification with distortion detection and filtering is shown. Block 402 classifies the distortion of an input image, for example an image that is generated by a camera 114. This step is separate from image classification, as it does not seek to analyze the contents of the image, but instead seeks to determine a target score that represents a level of distortion and/or to determine what type(s) of distortion the image has undergone.

Block 404 determines whether there is distortion present in the input image, for example by comparing the target score(s) to a threshold. If no distortion is present, then block 406 performs further analysis on the input image. For example, this analysis may include classification, such as by an object detection classifier, or face recognition.

If an above-threshold target score is found, block 408 filters the image, so that it is not used for analysis. In some cases, this may be performed at the camera 114, so that the distorted image need not even be transmitted. By filtering the image 408, erroneous analysis outputs and waste of computing and network resources may be prevented.

Using the identification of the type of distortion that is involved, block 410 may adjust image capture settings, for example settings on the camera 114 or environmental factors, to improve the quality of subsequent images. Such a change may, for example, include adjusting a frame rate to respond to high motion blur, to ensure that objects in motion are well-defined in captured images. Another such change may be based in the image capture software, for example by reducing the overall brightness of captured images to respond to images that are over-exposed.

Figure 5:
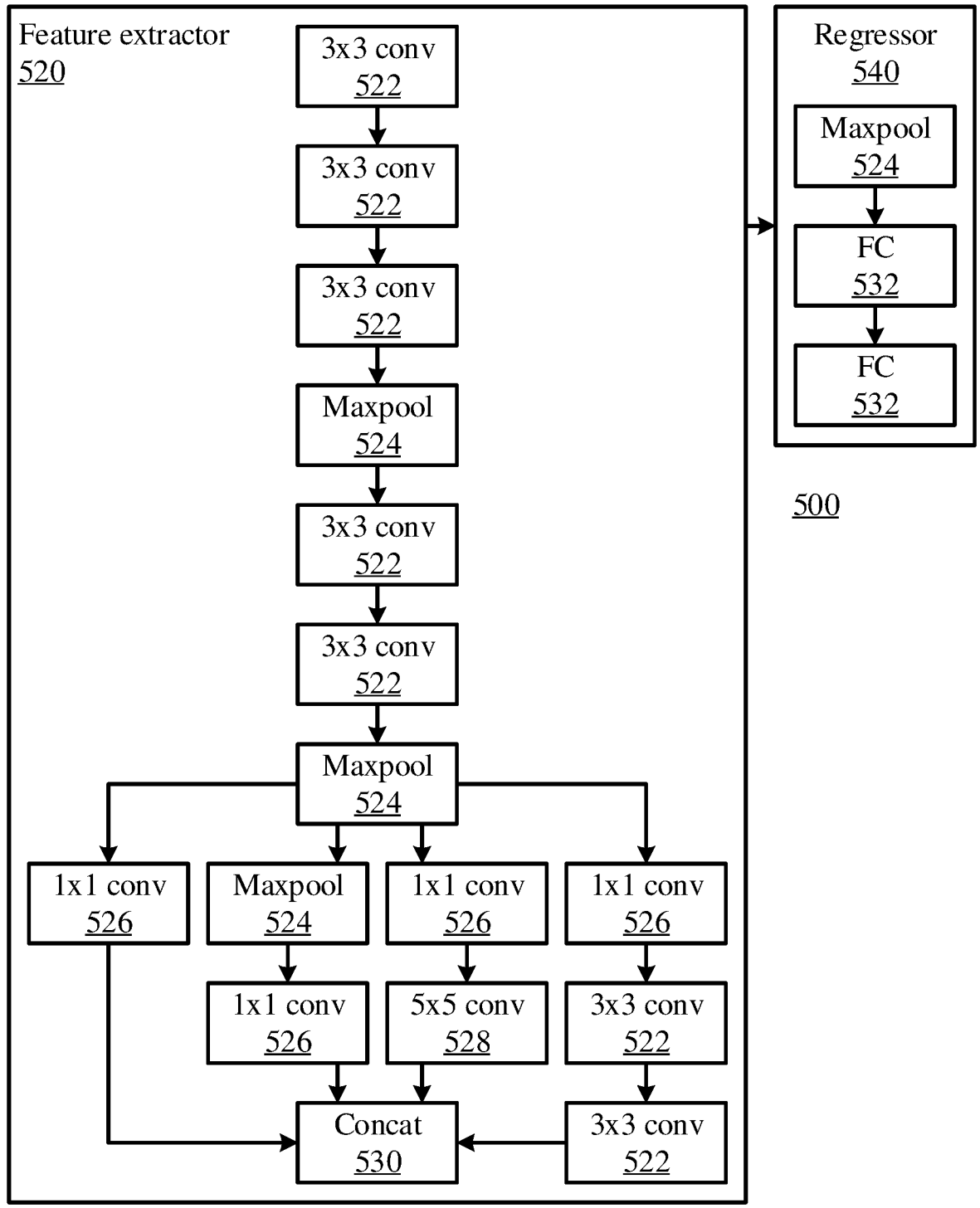
FIG. 5 is a block diagram of an image distortion detection model, including a feature extractor and a regressor, in accordance with an embodiment of the present invention.

Referring now to FIG. 5, an exemplary neural network structure is shown. The neural network 500 may include a feature extraction part 520 and a regressor 540. Different distortions manipulate local statistics at different granularities. For example, light exposure affects coarse textures, while motion blur and defocus blur affect finer textures. In the convolutional layers of the neural network 500, larger kernel sizes may focus less on local textures, while stacked convolutional layers can extract the fine-grained local features. To capture the different granularities, convolutional layers with diverse kernel sizes may be used in parallel. The feature extractor 520 may use various such layers, followed by a pooling layer 524, followed by fully connected layers 532 in the regressor 540.

Thus, for the specific illustrative example shown of the neural network 500, the layers may include 3×3 convolutional layers 522, followed by a maxpool layer 524, followed by additional 3×3 convolutional layers 522 and another maxpool layer 524. At his point, the neural network model 500 may split into multiple branches, each operating at different resolutions. A first branch may simply have a 1×1 convolutional layer 526. A second branch may have a maxpool layer 524, followed by a 1×1 convolutional layer 526. A third branch may have a 1×1 convolutional layer 526, followed by a 5×5 convolutional layer 528. A fourth branch may have a 1×1 convolutional layer 526, followed by two 3×3 convolutional layers 522. Each branch may then be concatenated together at concatenator 530.

The output of the feature extractor 520 may then pass to regressor 540. A maxpool layer 524 accepts the concatenated output, and then two fully connected layers 532 provide further processing to generate an output of the neural network 500.

To train the neural network 500, transfer learning may be used. The weights of the layers of the feature extractor 520 may be initialized using a pre-trained model, and may then be frozen during training. Then, in some cases, only the weights of the regressor 540 may be updated. In one specific example, the weights of the feature extractor may be initialized using weights from a pre-trained image recognition model.

Using the target scores generated by the image classification model(s) provides a significant improvement in the correlation between image quality scores and classifier confidence. Thus, when the neural network model 500 estimates the quality of an image to be low, it is likely that the classifier used for subsequent image analysis is likely to make a classification error. As a result, the neural network model 500 can provide a strong indication of whether a given image should be filtered out.

Because the downstream image analysis may use a variety of different models, such as object detection for detecting pedestrians or cars, face detection or person detection, body keypoint detection for estimating pose and recognizing actions, and instance segmentation to localize objects within frames, and because some applications may use multiple such models for each input image, the quality assessment may indicate whether specific models will perform poorly on a given input image. The target score that is generated may not be dependent on a specific downstream analysis task, but should nonetheless provide good results for all such tasks.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Figure 6:
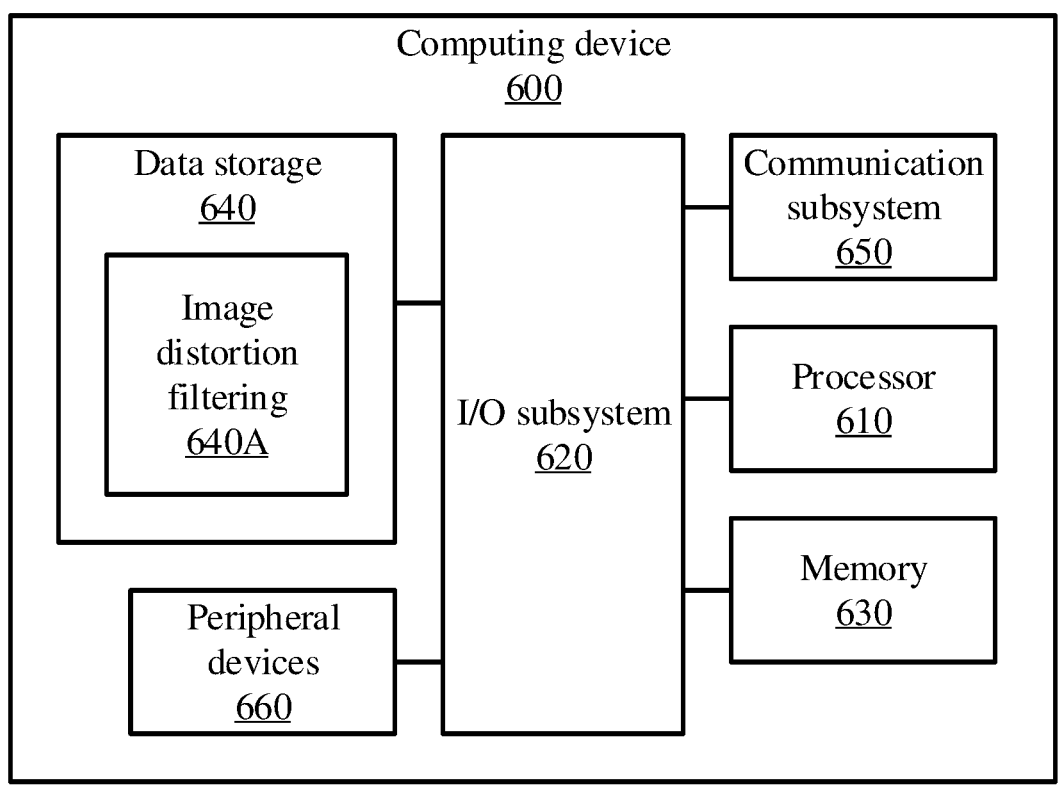
FIG. 6 is a block diagram of a computing device that may be used to implement image distortion filtering, in accordance with an embodiment of the present invention.

Referring now to FIG. 6, a block diagram shows an exemplary computing device 600, in accordance with an embodiment of the present invention. The computing device 600 is configured to perform image distortion filtering.

The computing device 600 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 600 may be embodied as a one or more compute sleds, memory sleds, or other racks, sleds, computing chassis, or other components of a physically disaggregated computing device.

As shown in FIG. 6, the computing device 600 illustratively includes the processor 610, an input/output subsystem 620, a memory 630, a data storage device 640, and a communication subsystem 650, and/or other components and devices commonly found in a server or similar computing device. The computing device 600 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 630, or portions thereof, may be incorporated in the processor 610 in some embodiments.

The processor 610 may be embodied as any type of processor capable of performing the functions described herein. The processor 610 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 630 may be embodied as any type of volatile or non-volatile memory or data storage capable of performing the functions described herein. In operation, the memory 630 may store various data and software used during operation of the computing device 600, such as operating systems, applications, programs, libraries, and drivers. The memory 630 is communicatively coupled to the processor 610 via the I/O subsystem 620, which may be embodied as circuitry and/or components to facilitate input/output operations with the processor 610, the memory 630, and other components of the computing device 600. For example, the I/O subsystem 620 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.), and/or other components and subsystems to facilitate the input/output operations. In some embodiments, the I/O subsystem 620 may form a portion of a system-on-a-chip (SOC) and be incorporated, along with the processor 610, the memory 630, and other components of the computing device 600, on a single integrated circuit chip.

The data storage device 640 may be embodied as any type of device or devices configured for short-term or long-term storage of data such as, for example, memory devices and circuits, memory cards, hard disk drives, solid state drives, or other data storage devices. The data storage device 640 can store program code 640A for image distortion filtering. The communication subsystem 650 of the computing device 600 may be embodied as any network interface controller or other communication circuit, device, or collection thereof, capable of enabling communications between the computing device 600 and other remote devices over a network. The communication subsystem 650 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 600 may also include one or more peripheral devices 660. The peripheral devices 660 may include any number of additional input/output devices, interface devices, and/or other peripheral devices. For example, in some embodiments, the peripheral devices 660 may include a display, touch screen, graphics circuitry, keyboard, mouse, speaker system, microphone, network interface, and/or other input/output devices, interface devices, and/or peripheral devices.

Of course, the computing device 600 may also include other elements (not shown), as readily contemplated by one of skill in the art, as well as omit certain elements. For example, various other sensors, input devices, and/or output devices can be included in computing device 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 600 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 7:
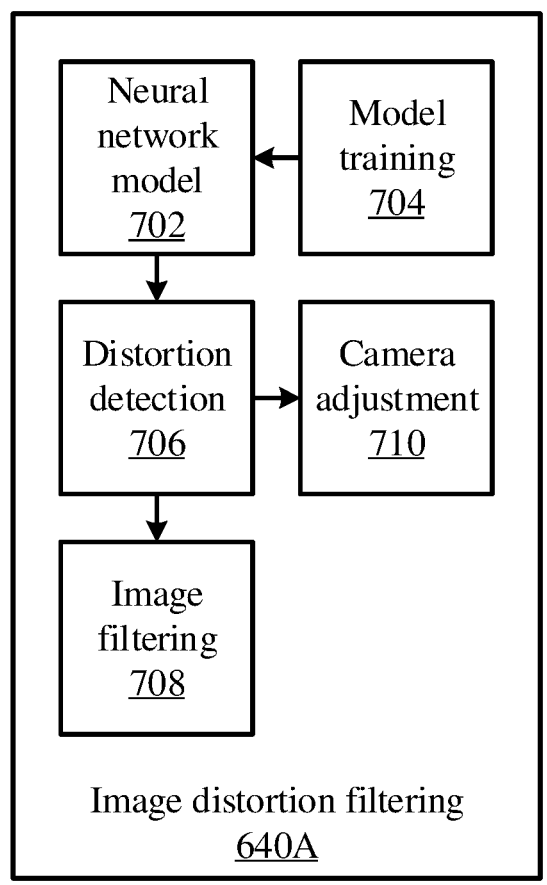
FIG. 7 is a block diagram of a computer program to perform image distortion filtering, in accordance with an embodiment of the present invention.

Referring now to FIG. 7, additional detail on the image distortion filtering 640A is shown. A neural network model 702 is trained in model training 704 to detect distortion levels within input images. Distortion detection 706 uses the trained neural network model 702 to perform such detection, identifying whether a given input image has an above-threshold level of distortion. Image filtering 708 may filter out input images with above-threshold distortion levels. Camera adjustment 710 may communicate with a camera 114, for example using communication subsystem 650, to change settings at the camera 114.

Regarding the neural network model 702, a neural network is a generalized system that improves its functioning and accuracy through exposure to additional empirical data. The neural network becomes trained by exposure to the empirical data. During training, the neural network stores and adjusts a plurality of weights that are applied to the incoming empirical data. By applying the adjusted weights to the data, the data can be identified as belonging to a particular predefined class from a set of classes or a probability that the inputted data belongs to each of the classes can be outputted.

The empirical data, also known as training data, from a set of examples can be formatted as a string of values and fed into the input of the neural network. Each example may be associated with a known result or output. Each example can be represented as a pair, (x, y), where x represents the input data and y represents the known output. The input data may include a variety of different data types, and may include multiple distinct values. The network can have one input node for each value making up the example's input data, and a separate weight can be applied to each input value. The input data can, for example, be formatted as a vector, an array, or a string depending on the architecture of the neural network being constructed and trained.

The neural network "learns" by comparing the neural network output generated from the input data to the known values of the examples, and adjusting the stored weights to minimize the differences between the output values and the known values. The adjustments may be made to the stored weights through back propagation, where the effect of the weights on the output values may be determined by calculating the mathematical gradient and adjusting the weights in a manner that shifts the output towards a minimum difference. This optimization, referred to as a gradient descent approach, is a non-limiting example of how training may be performed. A subset of examples with known values that were not used for training can be used to test and validate the accuracy of the neural network.

During operation, the trained neural network can be used on new data that was not previously used in training or validation through generalization. The adjusted weights of the neural network can be applied to the new data, where the weights estimate a function developed from the training examples. The parameters of the estimated function which are captured by the weights are based on statistical inference.

Figure 8:
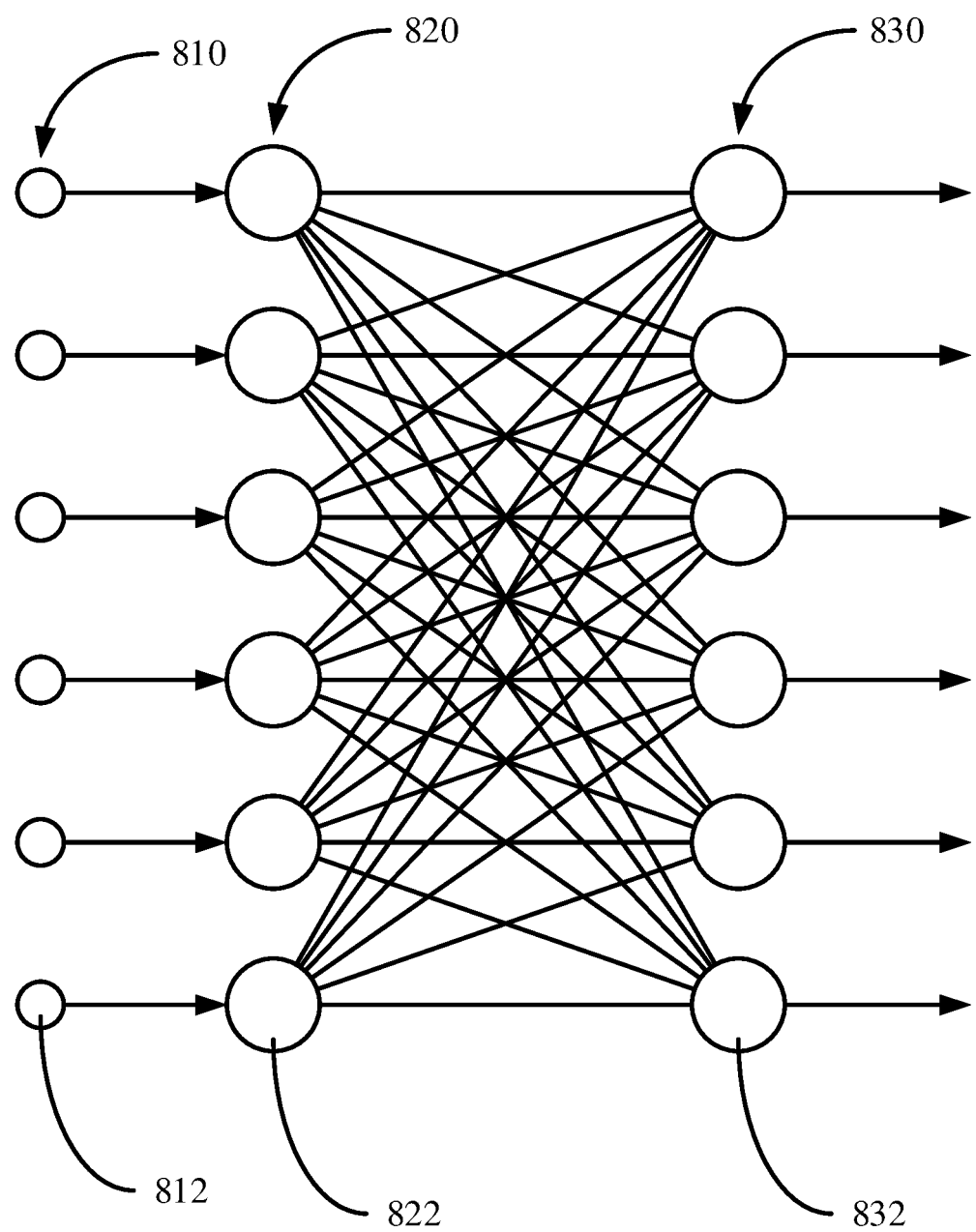
FIG. 8 is a diagram of a neural network architecture that may be used to implement one or more parts of an image distortion detection model, in accordance with an embodiment of the present invention.

Referring now to FIG. 8, an exemplary neural network architecture is shown. In layered neural networks, nodes are arranged in the form of layers. A simple neural network has an input layer 1020 of source nodes 1022, a single computation layer 1030 having one or more computation nodes 1032 that also act as output nodes, where there is a single node 1032 for each possible category into which the input example could be classified. An input layer 1020 can have a number of source nodes 1022 equal to the number of data values 1012 in the input data 1010. The data values 1012 in the input data 1010 can be represented as a column vector. Each computational node 1030 in the computation layer generates a linear combination of weighted values from the input data 1010 fed into input nodes 1020, and applies a non-linear activation function that is differentiable to the sum. The simple neural network can perform classification on linearly separable examples (e.g., patterns).

Figure 9:
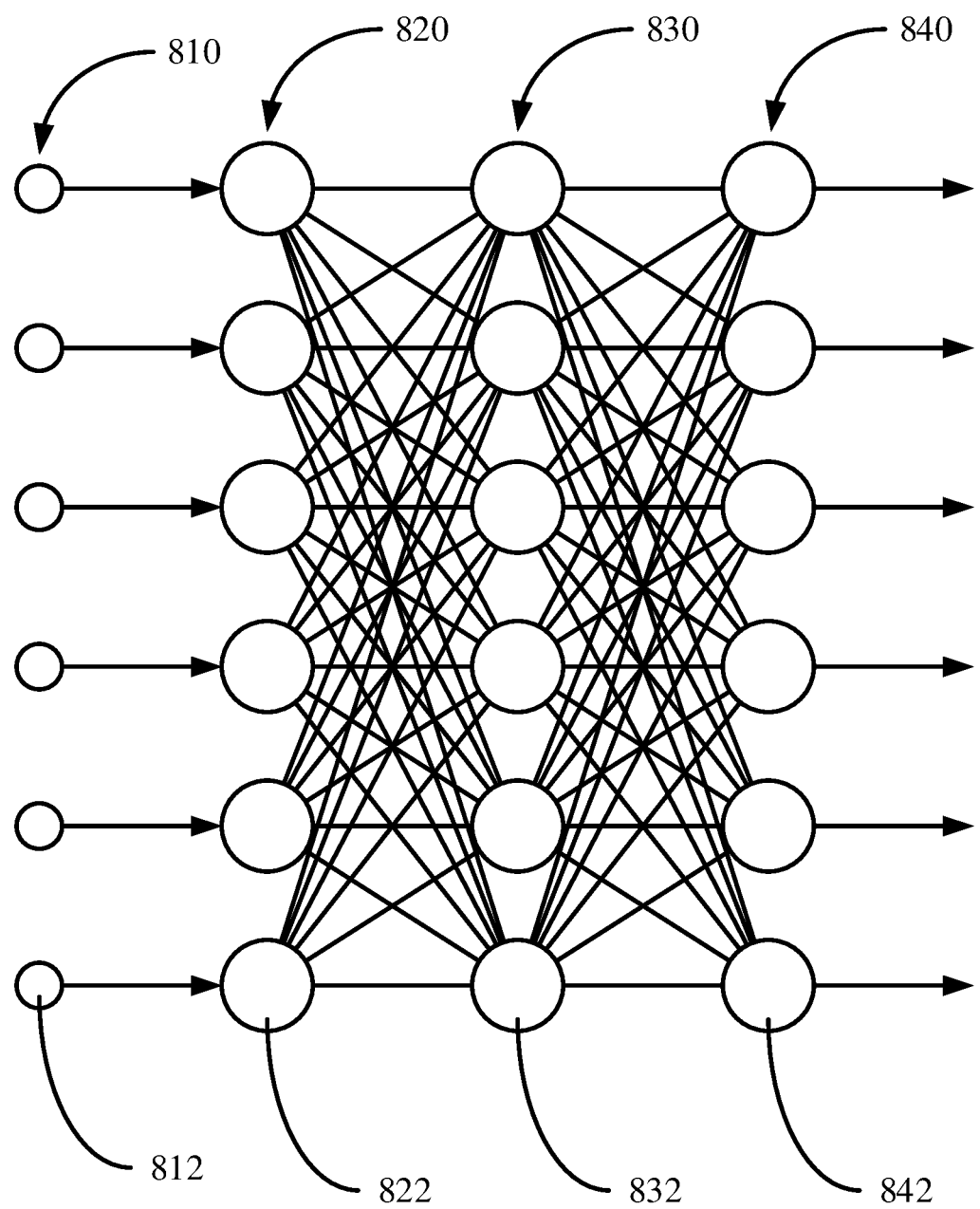
FIG. 9 is a diagram of a deep neural network architecture that may be used to implement one or more parts of an image distortion detection model, in accordance with an embodiment of the present invention.

Referring now to FIG. 9, a deep neural network architecture is shown. A deep neural network, also referred to as a multilayer perceptron, has an input layer 1020 of source nodes 1022, one or more computation layer(s) 1030 having one or more computation nodes 1032, and an output layer 1040, where there is a single output node 1042 for each possible category into which the input example could be classified. An input layer 1020 can have a number of source nodes 1022 equal to the number of data values 1012 in the input data 1010. The computation nodes 1032 in the computation layer(s) 1030 can also be referred to as hidden layers because they are between the source nodes 1022 and output node(s) 1042 and not directly observed. Each node 1032, 1042 in a computation layer generates a linear combination of weighted values from the values output from the nodes in a previous layer, and applies a non-linear activation function that is differentiable to the sum. The weights applied to the value from each previous node can be denoted, for example, by $w_1$, $w_2$, $w_{n-1}$, $w_n$. The output layer provides the overall response of the network to the inputted data. A deep neural network can be fully connected, where each node in a computational layer is connected to all other nodes in the previous layer. If links between nodes are missing the network is referred to as partially connected.

Training a deep neural network can involve two phases, a forward phase where the weights of each node are fixed and the input propagates through the network, and a backwards phase where an error value is propagated backwards through the network.

The computation nodes 1032 in the one or more computation (hidden) layer(s) 1030 perform a nonlinear transformation on the input data 1012 that generates a feature space. The feature space the classes or categories may be more easily separated than in the original data space.

The neural network architectures of FIGS. 8 and 9 may be used to implement, for example the fully connected layers 532 of the neural network 500. The other layers may be implemented using the appropriate respective architectures, such as convolutional neural network (CNN) layers. CNNs process information using a sliding "window" across an input, with each neuron in a CNN layer having a respective "filter" that is applied at each window position. Each filter may be trained, for example, to handle a respective pattern within an input. CNNs are particularly useful in processing images, where local relationships between individual pixels may be captured by the filter as it passes through different regions of the image. The output of a neuron in a CNN layer may include a set of values, representing whether the respective filter matched each set of values in the sliding window.

To train a neural network, training data can be divided into a training set and a testing set. The training data includes pairs of an input and a known output. During training, the inputs of the training set are fed into the neural network using feed-forward propagation. After each input, the output of the neural network is compared to the respective known output. Discrepancies between the output of the neural network and the known output that is associated with that particular input are used to generate an error value, which may be backpropagated through the neural network, after which the weight values of the neural network may be updated. This process continues until the pairs in the training set are exhausted.

After the training has been completed, the neural network may be tested against the testing set, to ensure that the training has not resulted in overfitting. If the neural network can generalize to new inputs, beyond those which it was already trained on, then it is ready for use. If the neural network does not accurately reproduce the known outputs of the testing set, then additional training data may be needed, or hyperparameters of the neural network may need to be adjusted.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for image filtering, comprising:
    detecting a distortion level of input images, using a distortion detection model that is trained using confidence values generated by a pre-trained image classifier with a set of distorted training images;
    performing analysis on input images having a detected distortion level that is lower than a threshold, with input images having an above-threshold detected distortion level being filtered out; and
    adjusting an image capture setting responsive to a determination that the input image has an above-threshold distortion level.

2. The computer-implemented method of claim 1, further comprising training the distortion detection model using the set of distorted training images, each distorted training image having an associated target score that is based on the confidence values generated by the pre-trained image classifier.

3. The computer-implemented method of claim 2, further comprising generating the set of distorted training images by performing a plurality of distortion operations on original training images.

4. The computer-implemented method of claim 3, wherein generating the set of distorted training images further includes generating a target score for each respective distorted training image by aggregating confidence scores from a plurality of pre-trained image classifiers using the respective distorted training image as input.

5. The computer-implemented method of claim 1, further comprising training the distortion detection model using a set of distorted training images, each distorted training image having an associated target score that is based on a distance between a classifier softmax output for the distorted training image and a classifier softmax output for an original undistorted version of the distorted training image.

6. The computer-implemented method of claim 1, wherein the image capture setting is selected from the group consisting of a camera frame rate and a brightness.

7. The computer-implemented method of claim 1, wherein the distortion detection model is implemented as a neural network model that includes a feature extractor with a plurality of branches of convolutional layers and a regressor with fully connected layers.

8. The computer-implemented method of claim 7, wherein the plurality of branches include convolutional layers of different kernel sizes.

9. The computer-implemented method of claim 8, wherein the feature extractor concatenates outputs of the plurality of branches to generate a feature extractor output.

10. A computer-implemented method for image filtering, comprising:
    performing a plurality of distortion operations on a set of original training images to generate distorted training images corresponding to the original training images;
    training a neural network of a distortion detection model using the set of original training images and the distorted training images corresponding to the original training images, based on confidence values generated by a pre-trained image classifier;
    detecting a distortion level of input images, using the distortion detection model;
    performing analysis on input images having a detected distortion level that is lower than a threshold, with input images having an above-threshold detected distortion level being filtered out; and
    adjusting an image capture setting responsive to a determination that the input image has an above-threshold distortion level.

11. A system for image filtering, comprising:
    a hardware processor; and
    a memory that stores a computer program, which, when executed by the hardware processor, causes the hardware processor to:
        detect a distortion level of input images, using a distortion detection model that is trained using confidence values generated by a pre-trained image classifier with a set of distorted training images;
        perform analysis on input images having a detected distortion level that is lower than a threshold, with input images having an above-threshold detected distortion level being filtered out; and
        adjust an image capture setting responsive to a determination that the input image has an above-threshold distortion level.

12. The system of claim 11, wherein the image capture setting is selected from the group consisting of a camera frame rate and a brightness.

13. The system of claim 11, wherein the computer program further causes the hardware processor to train distortion detection model using the set of distorted training images, each distorted training image having an associated target score that is based on the confidence values generated by the pre-trained image classifier.

14. The system of claim 13, wherein the computer program further causes the hardware processor to generate the set of distorted training images by performing a plurality of distortion operations on original training images.

15. The system of claim 14, wherein the computer program further causes the hardware processor to generate a target score for each respective distorted training image by aggregating confidence scores from a plurality of pre-trained image classifiers using the respective distorted training image as input.

16. The system of claim 11, wherein the computer program further causes the hardware processor to train the distortion detection model using a set of distorted training images, each distorted training image having an associated target score that is based on a distance between a classifier softmax output for the distorted training image and a classifier softmax output for an original undistorted version of the distorted training image.

17. The system of claim 11, wherein the distortion detection model is implemented as a neural network model that includes a feature extractor with a plurality of branches of convolutional layers and a regressor with fully connected layers.

18. The system of claim 17, wherein the plurality of branches include convolutional layers of different kernel sizes.

\* \* \* \* \*